US008208558B2

(12) United States Patent
Nagori

(10) Patent No.: US 8,208,558 B2
(45) Date of Patent: Jun. 26, 2012

(54) TRANSFORM DOMAIN FAST MODE SEARCH FOR SPATIAL PREDICTION IN ADVANCED VIDEO CODING

(75) Inventor: Soyeb N. Nagori, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 1023 days.

(21) Appl. No.: 12/135,430

(22) Filed: Jun. 9, 2008

(65) Prior Publication Data

US 2008/0304763 A1  Dec. 11, 2008

Related U.S. Application Data

(60) Provisional application No. 60/943,080, filed on Jun. 11, 2007.

(51) Int. Cl.
H04N 7/12 (2006.01)
(52) U.S. Cl. ................................. 375/240.24
(58) Field of Classification Search ............. 375/240.2, 375/240.24
See application file for complete search history.

(56) References Cited

U.S. PATENT DOCUMENTS

| | | | | |
|---|---|---|---|---|
| 5,113,256 A | * | 5/1992 | Citta et al. | 348/384.1 |
| 5,646,618 A | * | 7/1997 | Walsh | 341/67 |
| 7,706,443 B2 | * | 4/2010 | Chandramouly et al. | 375/240.12 |
| 2006/0088098 A1 | * | 4/2006 | Vehvilainen | 375/240.03 |
| 2006/0182174 A1 | * | 8/2006 | Kuo | 375/240.03 |
| 2008/0232463 A1 | * | 9/2008 | Lu et al. | 375/240.02 |

OTHER PUBLICATIONS

"Efficient Fast Intra Mode Decision using Transform Coefficients" Advanced Communication Technology, The 9th International Conference on, vol. 1, No., pp. 399-402, Feb. 12-14, 2007 to Hwang et al.*
"Fast selective intra mode decision in H.264/AVC," Consumer Communications and Networking Conference, 2006. CCNC 2006. 3rd IEEE, vol. 2, No., pp. 1068-1072, Jan. 8-10, 2006 to Park et al.*
Jhing-Fa Wang; Jia-Ching Wang; Jang-Ting Chen; An-Chao Tsai; Anand Paul; , "A novel fast algorithm for intra mode decision in H.264/AVC encoders," Circuits and Systems, 2006. ISCAS 2006. Proceedings. 2006 IEEE International Symposium on.*
"H.264 Fast Intra-Prediction Mode Decision Based on Frequency Characteristic" to Tsukuba et al. in Proc. of EUSIPCO2005, Sep. 2005.*
Zhen Han; Ruimin Bu; Li Zhu; Qiong Liu; , "MPEG-2 to AVS-M Transcoder with Mode Decision Optimization for Mobile Video Communication," *Wireless Communications, Networking and Mobile Computing, 2006. WiCOM 2006.International Conference on*, vol., No., pp. 1-4, Sep. 22-24, 2006.*

* cited by examiner

*Primary Examiner* — Mehrdad Dastouri
*Assistant Examiner* — Mohammed Rahaman
(74) *Attorney, Agent, or Firm* — Robert D. Marshall, Jr.; Wade James Brady, III; Frederick J. Telecky, Jr.

(57) ABSTRACT

This invention is method for determining direction mode for an image block in intra prediction of video frames. The method calculates a plurality of energy terms from the spatial frequency domain image block, then determines a coarse classification from these energy terms. For at least some coarse classifications the method searches from among a subset of less than all possible direction modes. The method also searches a most likely direction mode determined from neighbor blocks when available.

17 Claims, 6 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

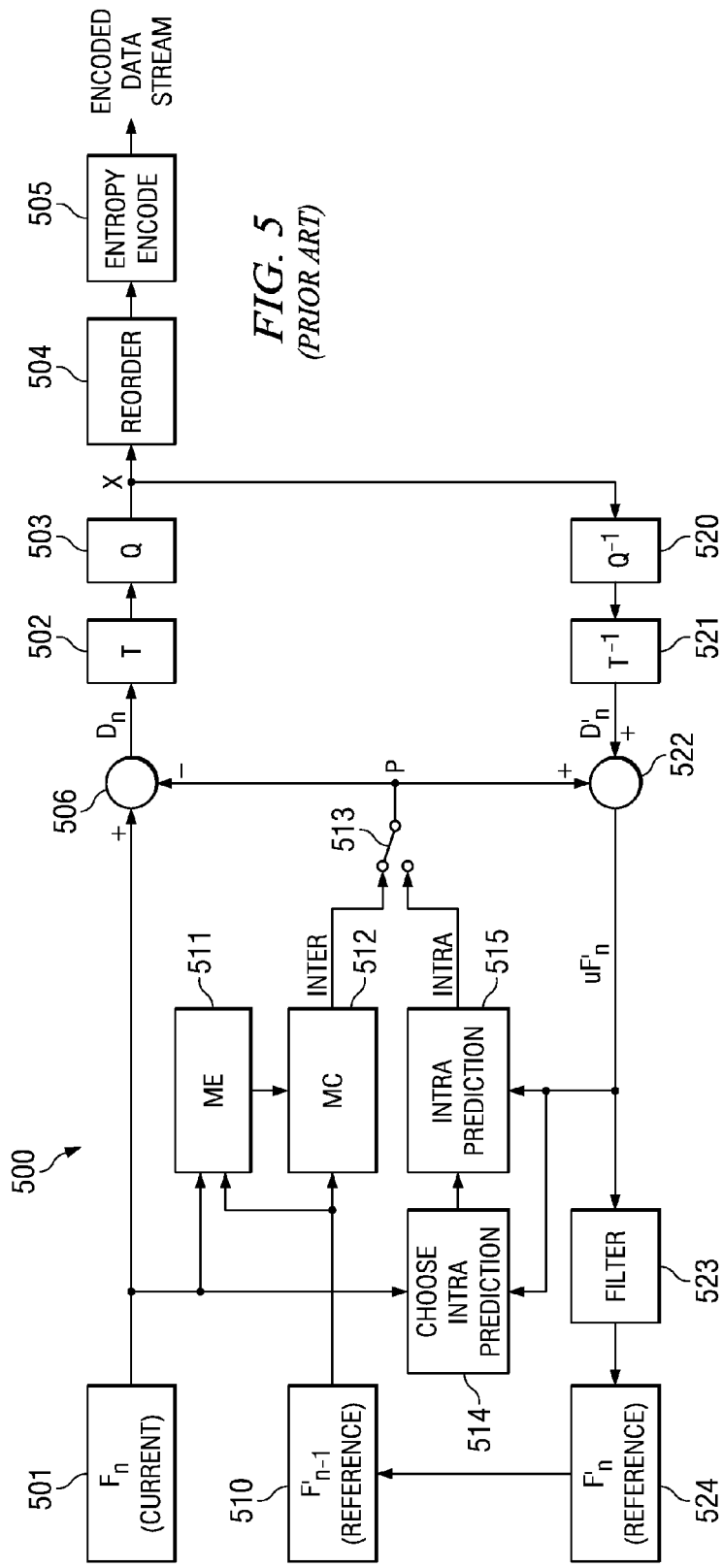

TRANSFORM DOMAIN FAST MODE SEARCH FOR SPATIAL PREDICTION IN ADVANCED VIDEO CODING

CLAIM OF PRIORITY

This application claims priority under 35 U.S.C. 119(e)(1) to U.S. Provisional Application No. 60/943,080 filed Jun. 11, 2007.

TECHNICAL FIELD OF THE INVENTION

The technical field of this invention is video data encoding.

BACKGROUND OF THE INVENTION

Spatial Domain Intra prediction is one of the important tools in the advanced video coding standards such as H.264, VC1 and AVS. H.264 intra prediction allows two modes, an Intra 16×16 (I16×16) mode and an Intra 4×4 (I4×4) mode based on the prediction block size. Experiments reveal that the I16×16 mode works well in flat regions of the image. In contrast, the I4×4 mode is especially effective at lower resolutions (such as QVGA, CIF, QCIF etc) or when the picture has more detail. The I4×4 mode is more demanding in computational complexity. The complexity of determining the optimal I4×4 prediction mode is challenging because: (i) there are nine allowed modes that must be searched; and (ii) the I4×4 mode decision depends on the reconstructed pixels of other causal 4×4 blocks within the same macroblock. This acquires the optimal mode, quantization parameter and other features of the macroblock. The optimal manner of determining the prediction mode is extremely complex and not suitable for real-time systems.

SUMMARY OF THE INVENTION

It is important to use a nearly optimal mode to get the best possible compression efficiency when coding in I4×4 mode. This invention solves this problem.

To reduce the computational complexity of video coding in I4×4 mode, this invention uses an algorithm based on transform domain energy distribution of input samples. Experiments suggest that features derived from transform domain energy of the input samples can be used to classify a 4×4 block on the basis of direction which can be used for pruning certain modes. This algorithm first looks at energy distribution among transform domain coefficients and classifies each 4×4 block into one of the five classes. These five classes are DC, horizontal, vertical, diagonal and ambiguous. Each class contains a small sub-set of Intra 4×4 prediction modes associated with the specific direction. For example, the horizontal class contains horizontal, horizontal-up and horizontal-down prediction modes. Following determination of the class, a second step conducts a full search amongst the small set of modes within the class. The first step reduces computational complexity tremendously while the second step helps obtain the best possible compression efficiency at the least possible computational cost.

This invention classifies each 4×4 block in well defined coarse classes. These coarse classes are DC, horizontal, vertical, diagonal and ambiguous. This classification is made by examining energy distribution of transformed coefficients. After classifying the 4×4 block, this invention searches a small set of modes under the class.

This invention reduces the complexity of I4×4 mode decisions by around 70% while maintaining almost same quality as compared to a brute force algorithm. This invention uses the same integer discrete cosine transform as used in forward encoding path for which faster implementation is available. This reduces additional complexity of transforming input samples.

BRIEF DESCRIPTION OF THE DRAWINGS

These and other aspects of this invention are illustrated in the drawings, in which:

FIG. 4 illustrates the instruction syntax of the very long instruction word digital signal processor core illustrated in FIG. 2 (prior art);

FIG. 5 illustrates an overview of the video encoding process of the prior art;

DETAILED DESCRIPTION OF PREFERRED EMBODIMENTS

Figure 1:
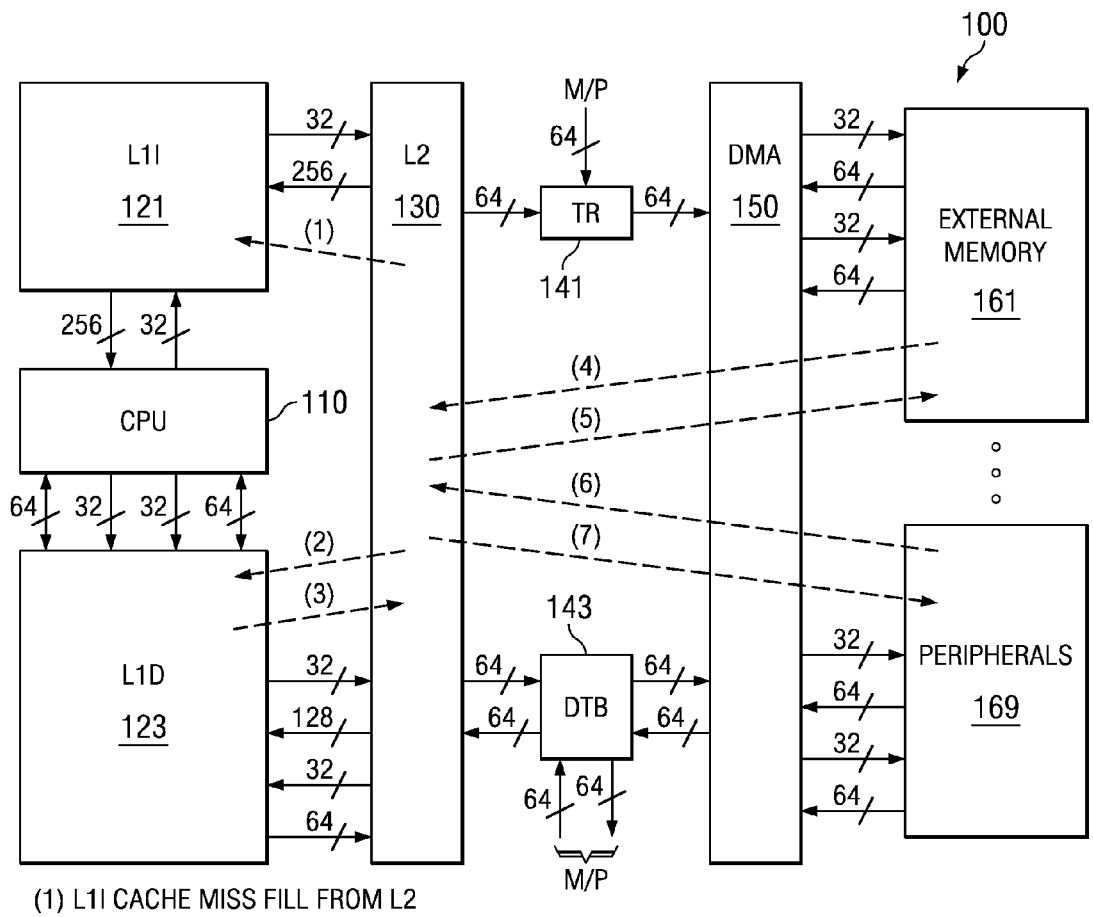
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
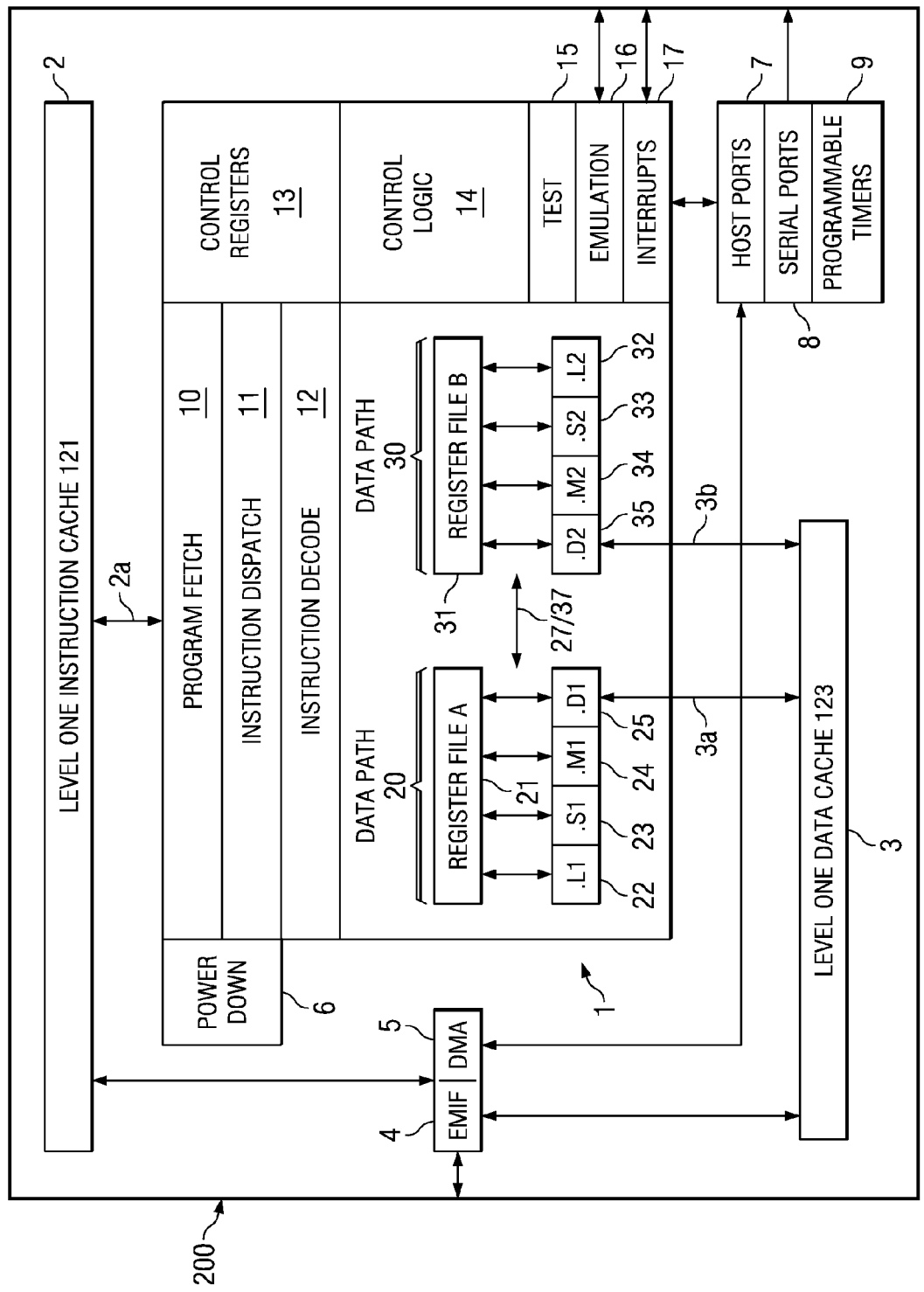
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
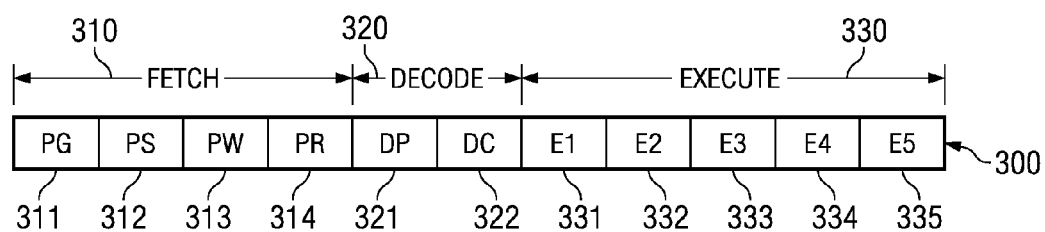
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the encoding process 500 of video encoding according to the prior art. Many video encoding standards use similar processes such as represented in FIG. 5. Encoding process 500 begins with the n th frame $F_n$ 501. Frequency transform block 502 transforms a macroblock of the pixel data into the spatial frequency domain. This typically involves a discrete cosine transform (DCT). This frequency domain data is quantized in quantization block 503. This quantization typically takes into account the range of data values for the current macroblock. Thus differing macroblocks may have differing quantizations. In accordance with the H.264 standard, in the base profile the macroblock data may be arbitrarily reordered via reorder block 504. As will be explained below, this reordering is reversed upon decoding. Other video encoding standards and the H.264 main profile transmit data for the macroblocks in strict raster scan order. The quantized data is encoded by entropy encoding block 505. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n−1 th frame $F_{n-1}$ 510 and data from the current frame $F_n$ 501 supply motion estimation block 511. Motion estimation block 511 determines the positions and motion vectors of moving objects within the picture. This motion data is supplied to motion compensation block 512 along with data from frame $F_{n-1}$ 510. The resulting motion compensated frame data is selected by switch 513 for application to subtraction unit 506. Subtraction unit 506 subtracts the inter prediction data from switch 513 from the input frame data from current frame $F_n$ 501. Thus frequency transform block 502, quantization block 503, reorder block 504 and entropy encoding block 505 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 511 and motion compensation block 512 find no moving objects to code. If the current frame $F_n$ and the prior frame $F_{n-1}$ are identical, the subtraction unit 506 will produce a string of zeros for data. This data string can be encoded using few bits.

The second type of prediction is intra prediction. Intra prediction predicts a macroblock of the current frame from another macroblock of that frame. Inverse quantization block 520 receives the quantized data from quantization block 503 and substantially recovers the original frequency domain data. Inverse frequency transform block 521 transforms the frequency domain data from inverse quantization block 520 back to the spatial domain. This spatial domain data supplies one input of addition unit 522, whose function will be further described. Encoding process 500 includes choose intra predication unit 514 to determine whether to implement intra prediction. Choose intra prediction unit 514 receives data from current frame $F_n$ 501 and the output of addition unit 522. Choose intra prediction unit 514 signals intra prediction intra predication unit 515, which also receives the output of addition unit 522. Switch 513 selects the intra prediction output for application to the subtraction input of subtraction units 506 and an addition input of addition unit 522. Intra prediction is based upon the recovered data from inverse quantization block 520 and inverse frequency transform block 521 in order to better match the processing at decoding. If the encoding used the original frame, there might be drift between these processes resulting in growing errors.

Video encoders typically periodically transmit unpredicted frames. In such an event the predicted frame is all 0's. Subtraction unit 506 thus produces data corresponding to the current frame $F_n$ 501 data. Periodic unpredicted or I frames limits any drift between the transmitter coding and the receive decoding. In a video movie a scene change may produce such a large change between adjacent frames that differential coding provides little advantage. Video coding standards typically signal whether a frame is a predicted frame and the type of prediction in the transmitted data stream.

Encoding process 500 includes reconstruction of the frame based upon this recovered data. The output of addition unit 522 supplies deblock filter 523. Deblock filter 523 smoothes artifacts created by the block and macroblock nature of the encoding process. The result is reconstructed frame $F'_n$ 524. As shown schematically in FIG. 5, this reconstructed frame $F'_n$ 524 becomes the next reference frame $F_{n-1}$ 510.

Figure 6:
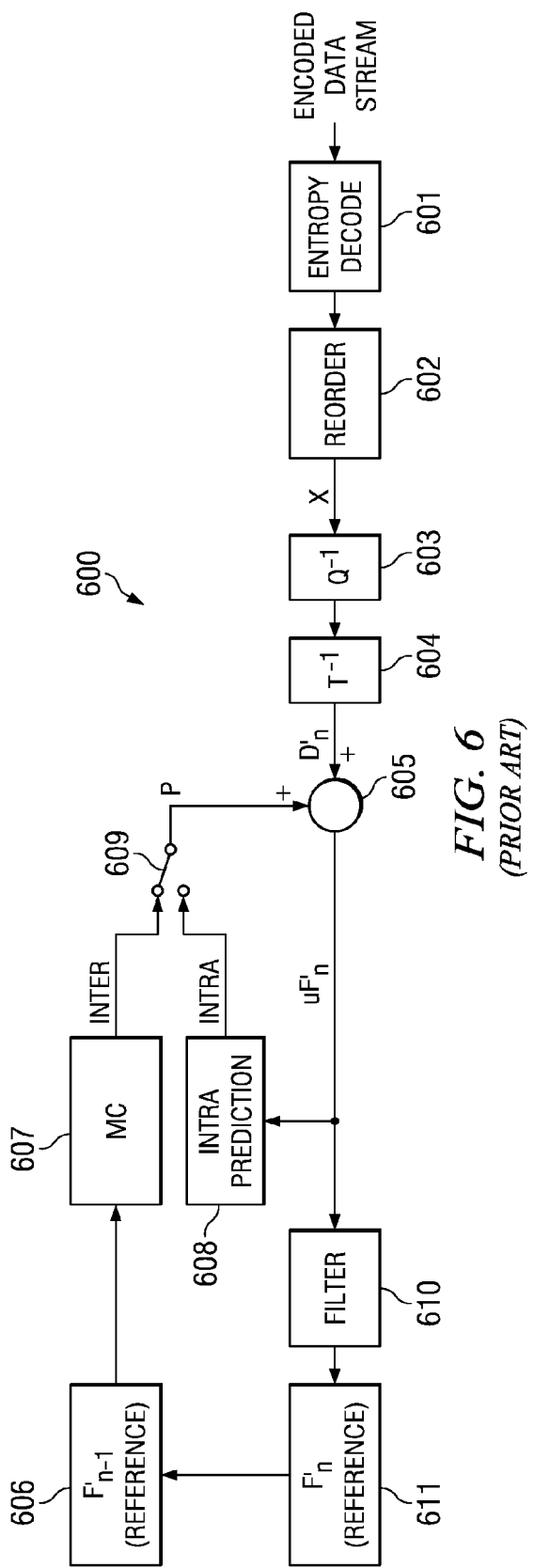
FIG. 6 illustrates an overview of the video decoding process of the prior art.

FIG. 6 illustrates the corresponding decoding process 600. Entropy decode unit 601 receives the encoded data stream. Entropy decode unit 601 recovers the symbols from the entropy encoding of entropy encoding unit 505. This invention is applicable to CABAC decoding. Reorder unit 602 assembles the macroblocks in raster scan order reversing the reordering of reorder unit 504. Inverse quantization block 603 receives the quantized data from reorder unit 602 and substantially recovers the original frequency domain data. Inverse frequency transform block 604 transforms the frequency domain data from inverse quantization block 603 back to the spatial domain. This spatial domain data supplies one input of addition unit 605. The other input of addition input 605 comes from switch 609. In inter mode switch 609 selects the output of motion compensation unit 607. Motion compensation unit 607 receives the reference frame $F'_{n-1}$ 606 and applies the motion compensation computed by motion compensation unit 512 and transmitted in the encoded data stream.

Switch 609 may also select intra prediction. The intra prediction is signaled in the encoded data stream. If this is selected, intra prediction unit 608 forms the predicted data from the output of adder 605 and then applies the intra prediction computed by intra prediction block 515 of the encoding process 500. Addition unit 605 recovers the predicted frame. As previously discussed in conjunction with encoding, it is possible to transmit an unpredicted or I frame. If the data stream signals that a received frame is an I frame, then the predicted frame supplied to addition unit 605 is all 0's.

The output of addition unit 605 supplies the input of deblock filter 610. Deblock filter 610 smoothes artifacts created by the block and macroblock nature of the encoding process. The result is reconstructed frame $F'_n$ 611. As shown schematically in FIG. 6, this reconstructed frame $F'_n$ 611 becomes the next reference frame $F_{n-1}$ 606.

The deblocking filtering of deblock filter 523 and deblock 610 must be the same. This enables the decoding process to accurately reflect the input frame $F_n$ 501 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

The H.264 Advanced Video coding standard achieves video quality similar to older standards such as MPEG2 and H.263 at nearly half the bit rate. This compression improvement is attributed to several new tools introduced in the H.264 standard. These include: spatial intra prediction; adaptive block size for motion compensation; in loop de-blocking filter; context adaptive binary arithmetic coding (CABAC); and multiple reference frames.

While these new tools allow better coding efficiency, they also introduce additional computational complexity into both encoder and decoder. This invention is are especially concerned with the impact of intra prediction on the computational complexity of the encoder. Prior art H.264 implementations employ rate-distortion optimizations to search through all allowed intra-prediction modes to find the optimal mode. This approach always yields the optimal prediction mode, but it involves an extremely heavy computational cost. There is much interest in algorithms that reduce the computational complexity of searching for the best prediction mode, while retaining the quality advantages of full search Intra 4×4 prediction mode.

This invention reduces the complexity of full search by exploiting knowledge of the source statistics. Specifically, the invention analyzes the transform domain energy distribution of the original 4×4 block in different directions. The invention uses the results to eliminate unlikely modes and reduce the search space for the optimal intra prediction mode.

The H.264 standard allows prediction of pixel intensities in a current block from the causal (left and top) neighbor blocks. The Luma space includes two approaches to spatial prediction: Intra 16×16 (I16×16); and Intra 4×4 (I4×4). The encoder may choose either prediction approach on a per macroblock basis and determine the best mode within that approach. Experiments reveal that the I16×16 approach works well in flat regions of the image. In contrast, the I4×4 approach is especially effective at lower resolutions (such as QVGA, CIF, QCIF etc) or when the picture has more detail. The I4×4 approach is more demanding in computational complexity. This is primarily because the I4×4 approach allows nine different prediction modes.

Figure 7:
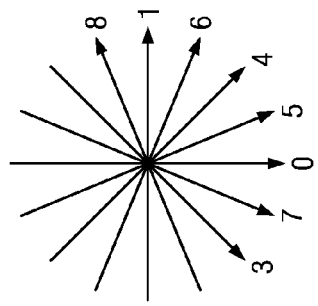
FIG. 7 illustrates the spatial prediction modes directions commonly used in video encoding standards (prior art)

FIG. 7 illustrates schematically these nine prediction modes. The first mode DC prediction predicts one DC value for the entire 4×4 sub-block. The other eight modes represent different prediction directions as illustrated in FIG. 7. The standard enumerations of these directions are shown in Table 2.

TABLE 2

| Enumeration | Definition |
| --- | --- |
| 0 | Vertical |
| 1 | Horizontal |
| 2 | DC |
|  | not shown in FIG. 7 |
| 3 | Diagonal Down Left |
| 4 | Diagonal Down Right |
| 5 | Vertical Right |
| 6 | Horizontal Down |

TABLE 2-continued

| Enumeration | Definition |
|---|---|
| 7 | Vertical Left |
| 8 | Horizontal Up |

Determining the optimal I4×4 prediction mode is complex because there are nine allowed modes to search and the I4×4 mode decision depends on the reconstructed pixels of other causal 4×4 blocks within the same macroblock (and hence on their optimal mode, quantization parameter etc).

There have been some attempts to reduce I4×4 prediction complexity. F. Pan, X. Lin, S. Rahardja, K. P. Lin, Z. G. Li, D. Wzi and S. Wu. "Fast Intra Mode-decision algorithm for H.264 AVC Video Coding" 2004 International Conference on Image Processing (ICIP) proposed generating an edge map by applying a two dimensional Sobel operator kernel on each pixel in the I4×4 block. Each point on the map is an edge vector with direction and magnitude. Pan et al then creates a direction histogram out of the edge map and prunes the likely set of modes to those corresponding to the most dominant directions. The rate-distortion optimized (RDO) search works on the pruned set. This reduces the number of candidate I4×4 modes to almost half the full search candidates. However the Sobel filter on each pixel and determining the dominant directions creates a significant additional computational cost. J-F Wang, J-C Wang, J-T Chen, A-C Tsai, Anand Paul, "A novel fast algorithm for intra mode decision in H.264/AVC encoders", Proceedings of the 2006 IEEE International Symposium on Circuits and Systems, 21-24 May 2006, pp 4 proposes to reduce the 4×4 block to a 2×2 by combining sets of 4 pixels in each quadrant, determining dominant edges from the 2×2 block and pruning the set of modes that must be RDO searched using the dominant edges.

A detailed analysis of the optimal I4×4 mode decision in a standard H.264 RDO-based search suggests that all nine I4×4 modes are important to high quality. No single mode can be dropped without significantly increasing bit-rate to maintain the same quality. With the exception of the DC mode, all other I4×4 modes are associated with a specific direction. Intuitively, the direction of the optimal prediction mode should match the direction of the edges in the input. This invention extracts edge features using a time-frequency transform of the I4×4 block. This invention uses the standard H.264 4×4 Integer transform to do this.

This invention applies the 4×4 integer transform to the 4×4 block of input samples $P_{ij}$ for i=0.3 and j=0.3. From the transform coefficients $X_{ij}$ for i=0.3 and j=0.3 this invention generates four energy parameters: $E_{dc}$, $E_{vert}$, $E_{horz}$, and $E_{diag}$ as follows:

$$E_{dc} = |X_{00}| \quad (1)$$

$$E_{vert} = |X_{01}| + |X_{02}| + |X_{03}| \quad (2)$$

$$E_{horz} = |X_{10}| + |X_{20}| + |X_{30}| \quad (3)$$

$$E_{diag} = |X_{11}| + |X_{12}| + |X_{13}| + |X_{21}| + |X_{22}| + |X_{23}| + |X_{31}| + |X_{32}| + |X_{33}| \quad (4)$$

Figure 8:
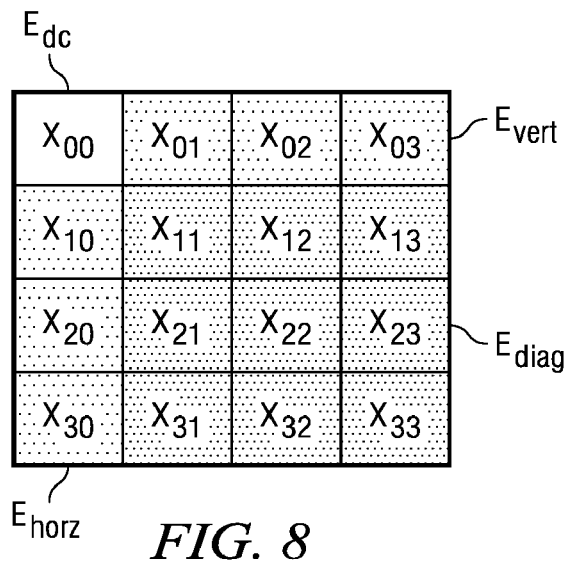
FIG. 8 illustrates the relationship between the energy terms and the transform coefficients according to this invention.

These calculations and the relationship between the energy terms and the transform coefficients is illustrated in FIG. 8. In general, either first or second norms of the transform coefficients can be used in calculation of energy terms. The preferred embodiment of this invention uses the first norm since the use of modulus over squared operation eliminates the need of multiplication without greatly prejudicing the results.

The invention next defines four coarse classes of directions for I4×4. A course class is assigned to each 4×4 block based on the energy parameters. The four course classes are: vertical; horizontal; diagonal; and ambiguous. Each 4×4 block is assigned one of the course classes or DC based upon the calculated energy terms. A first embodiment of the determination is as follows:

1. If $E_{vert} > T_m * E_{horz}$, then
   Coarse Class=Vertical
2. Else if $E_{horz} > T_m * E_{vert}$, then
   Coarse Class=Horizontal
3. Else if $E_{diag} > T_{diag}$ then
   Coarse class=Diagonal
4. Else If Max ($E_{vert}$, $E_{horz}$, $E_{diag}$)<$T_{dc} * E_{dc}$, then
   Coarse Class=DC
5. Else
   Coarse Class=Ambiguous where: $T_m$, $T_{diag}$ and $T_{dc}$ are predetermined empirical constants selected for the particular problem at hand. Suitable values for at least some applications are: $T_m=2$, $T_{diag}=10$ and $T_{dc}=1$.

A second alternate embodiment of the determination is as follows:

1. If ($E_{vert} > T_m * E_{horz}$) AND ($E_{vert} > T_{min}$) AND ($E_{vert} > E_{diag}$), then
   Coarse Class=Vertical
2. Else if ($E_{horz} > T_m * E_{vert}$) AND ($E_{horz} > T_{min}$) AND ($E_{horz} > E_{diag}$), then
   Coarse Class=Horizontal
3. Else if $E_{diag} > T_{diag}$ then
   Coarse class=Diagonal
4. Else If Max($E_{vert}$, $E_{horz}$, $E_{diag}$)<$T_{dc} * E_{dc}$, then
   Coarse Class=DC
5. Else
   Coarse Class=Ambiguous where: $T_m$, $T_{min}$, $T_{diag}$ and $T_{dc}$ are predetermined empirical constants selected for the particular problem at hand. Suitable values for at least some applications are: $T_m=2$, $T_{min}=10$, $T_{diag}=10$ and $T_{dc}=1$ Each of these coarse classes corresponds to a subset of I4×4 direction mode candidates to be searched in a closed loop fashion. Table 3 shows the direction modes as defined according to FIG. 7 corresponding to each coarse class.

TABLE 3

| Coarse Class | Directions to be Searched |
|---|---|
| DC | 2, M |
| Vertical | 0, 5, 7, M |
| Horizontal | 1, 6, 8, M |
| Diagonal | 3, 4, M |
| Ambiguous | 0, 1, 2, 3, 4, 5, 6, 7 and 8 | where: M indicates the most probable mode, which is a predicted mode based on adjacent blocks. The logic to determine the most probable mode M is identical to that used to determine most probable mode for 1-bit signaling in standard I4×4. Many times M may not be best mode in terms of sum of absolute values (SAD) and may not align with edge direction of input, but may be the best mode in terms of RDO. Only 3 less bits are required to signal this mode compared to other modes, because this mode M is always searched. In addition, inclusion of M among the candidate modes ensures that in the event that the classifier picks the wrong class, the most likely mode is not excluded from the final search. As an example, if a specific 4×4 block belongs to coarse class 2 (Vertical), then the directions 0, 5, 7 and M will be searched.

Figure 9:
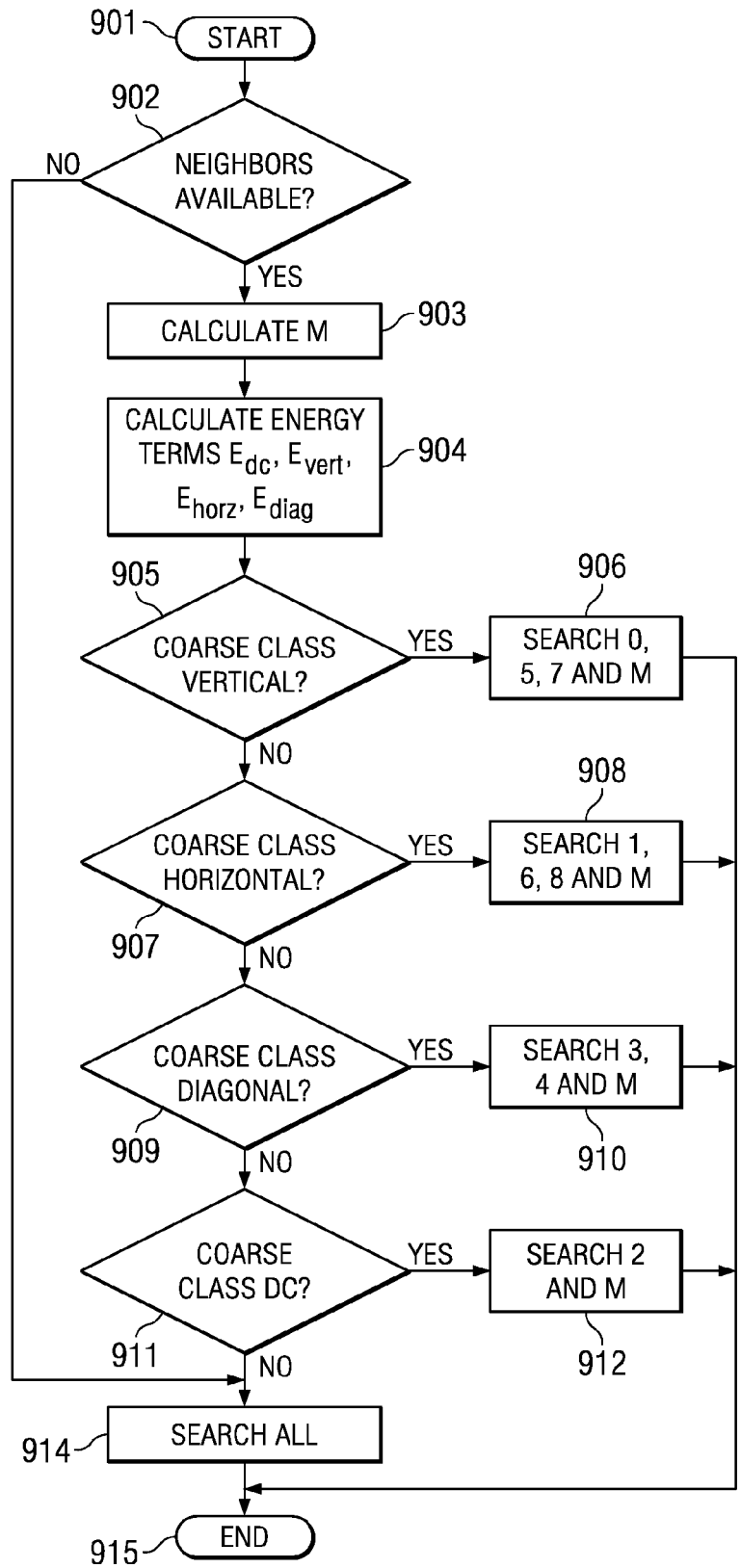
FIG. 9 illustrates the mode pruning algorithm of this invention.

FIG. 9 illustrates the full I4×4 mode pruning algorithm of this invention. The process begins with start block 901. Block 902 determines if the causal neighbor macroblocks are available. Such neighbors are used to determine the default classification for Intra prediction. These neighbors might be unavailable at the left or top edges of the frame. If one or more causal neighbors are not available for intra prediction (No at block 902), then the coarse class is ambiguous. The algorithm branches ahead to block 914 which performs a search on all the intra direction modes. If all the causal neighbor macroblocks are available (Yes at block 902), then block 903 calculates the default intra prediction direction from these neighbor macroblocks.

Following calculation of the default intra prediction direction in block 903, the algorithm calculates the energy terms $E_{dc}$, $E_{vert}$, $E_{horz}$ and $E_{diag}$ according to equations (1), (2), (3) and (4) above. These energy terms determine a coarse class as shown in Table 3.

Block 905 determines if this is a vertical coarse class according to a selected one of the two embodiments noted above. If this is the case (Yes at block 905), the block 906 performs an RDO-search for candidate directions 0 (Vertical), 5 (Vertical Right), 7 (Vertical Left) and M. The invention searches these candidate modes in a closed loop RDO fashion. Following determination of the direction, the algorithm is complete for the current macroblock and exits at end block 915.

If the test of block 905 fails (No at block 905), then block 907 determines if this is a horizontal coarse class according to a selected one of the two embodiments noted above. If this is the case (Yes at block 907), the block 908 performs an RDO-search for candidate directions 1 (Horizontal), 6 (Horizontal Down), 8 (Horizontal Up) and M. The invention searches these candidate modes in a closed loop RDO fashion. Following determination of the direction, the algorithm is complete for the current macroblock and exits at end block 915.

If the test of block 907 fails (No at block 907), then block 909 determines if this is a diagonal coarse class. Note this determination is identical in the two embodiments above. If this is the case (Yes at block 909), the block 910 performs an RDO-search for candidate directions 3 (Diagonal Down Left), 4 (Diagonal Down Right) and M. The invention searches these candidate modes in a closed loop RDO fashion. Following determination of the direction, the algorithm is complete for the current macroblock and exits at end block 915.

If the test of block 909 fails (No at block 909), then block 911 determines if this is a DC coarse class. Note this determination is identical in the two embodiments above. If this is the case (Yes at block 911), the block 912 performs an RDO-search for candidate directions 2 (DC) and M. The invention searches these candidate modes in a closed loop RDO fashion. Following determination of the direction, the algorithm is complete for the current macroblock and exits at end block 915.

If the test of block 911 fails (No at block 91), then the coarse class is ambiguous. Block 914 performs a search on all the intra direction modes. The algorithm is complete for the current macroblock and ends at end block 915.

This invention requires an additional 4×4 transform on the inputs signal $P_{ij}$ in calculation of the energy terms. These is a way to partially recoup this computational cost during the residual calculation step necessitated by RDO to compare the best I4×4 mode with the best I16×16 mode. In the prior art, the I4×4 residual signal is transformed via the integer 4×4 transform. Rather than re-calculating this transform for the final selected I4×4 mode, this invention takes advantage of some easy cases. This is based upon three facts: the integer transform is linear; the transform of the input signal is already available; and the transform of the predictions for some easy modes (vertical, horizontal and DC) can be calculated using simple pruned integer transforms.

Figure 10:
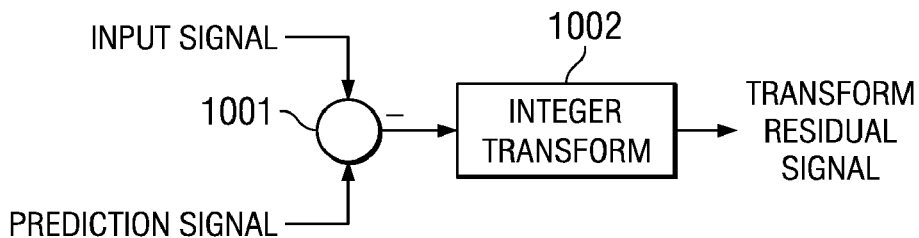
FIG. 10 illustrates a typical, prior art transformed residual calculation.

FIG. 10 illustrates a typical, prior art integer transformed residual calculation. Difference block 1001 computes the difference between the input signal and the prediction signal. This yields the residual signal. Block 1002 performs an integer transform on the residual signal to generate the transformed residual signal. This transform residual signal in used in the comparison of the best I4×4 mode with the best I16×16 mode.

Figure 11:
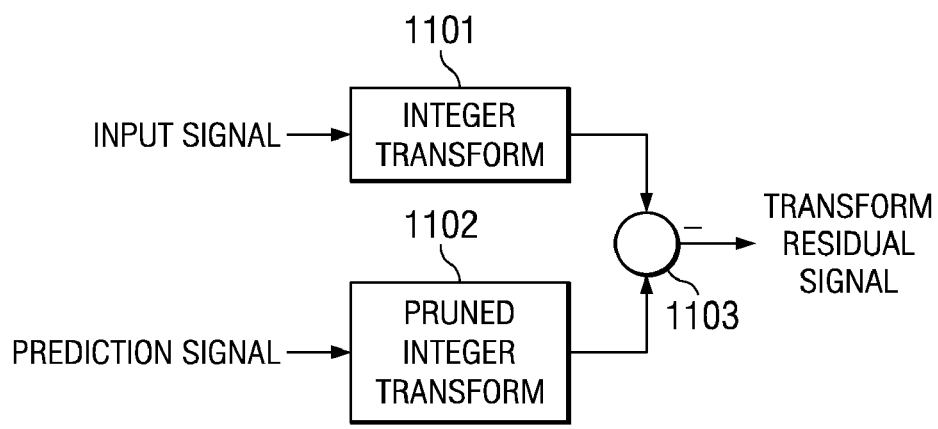
FIG. 11 illustrates a modified transformed residual calculation according to this invention.

FIG. 11 illustrates the modified integer transformed residual calculation according to this invention. This invention abandons the standard residual calculation approach illustrated in FIG. 10. This invention adopts the approach illustrated in FIG. 11 for the four easy modes. Block 1101 produces the integer transform of the input signal. The transform of this input signal is readily available having been calculated in block 502. Block 1102 produces the pruned integer transform of the residual signal. This pruning takes place as previously described. Note that calculation of the pruned integer transform requires less computation than the integer transform 1002. Difference block 1103 computes the transformed residual signal. This requires less computation than the prior art because the difference blocks are equivalent, the pruned integer transform 1102 requires less computation that the integer transform 1002 and the integer transform of the input signal requires no additional computation because it is computed for other purposes.

The proposed mode pruning algorithm was implemented on JM 9.8 provided by Joint Video Team, "Reference Software JM 9.8" available at http://iphome.hhi.de/suehring/tml/. A first experiment used the following settings for QCIF at 15 frames per second. Table 4 shows the parameters of the experiments.

TABLE 4

| Symbol Mode | CAVLC |
| --- | --- |
| Intra Frame Period | 1 second |
| Test Sequence | foreman_qcif_15fps |
| Basic Unit for RC | 11 MB |
| Motion Estimation | FastMe |
| Motion Vectors per Macroblock | 1 |
| Hadamard | Off |
| Target Bit Rates | 66 Kbps, 128 Kbps |

Tables 5 and 6 summarize the perceived signal-to-noise ratios (PSNRs) generated for this QCIF test sequence. Table 5 shows the results for 66 Kbps.

TABLE 5

|  | I16 × 16 | Full Search I4 × 4 | Pruned Search I4 × 4 |
| --- | --- | --- | --- |
| Luminance PSNR | 31.11 | 31.67 | 31.57 |
| Bit rate (Kbps) | 66.41 | 66.01 | 66.11 |

TABLE 5-continued

|  | I16 × 16 | Full Search I4 × 4 | Pruned Search I4 × 4 |
|---|---|---|---|
| Improvement due to I4 × 4 in dB | — | 0.56 | 0.46 |
| Reduction in Complexity | — | — | 67.70% |

Table 6 shows the results for 128 Kbps.

TABLE 6

|  | I16 × 16 | Full Search I4 × 4 | Pruned Search I4 × 4 |
|---|---|---|---|
| Luminance PSNR | 34.38 | 34.82 | 37.72 |
| Bit rate (Kbps) | 128.52 | 128.43 | 128.44 |
| Improvement due to I4 × 4 in dB | — | 0.44 | 0.34 |
| Reduction in Complexity | — | — | 67.84% |

A second experiment used the following settings for QCIF at 15 frames per second.

TABLE 7

| Symbol Mode | CAVLC |
|---|---|
| Intra Frame Period | 1 second |
| Test Sequence | foreman_qcif_30fps |
| Basic Unit for RC | 22 MB |
| Motion Estimation | FastMe |
| Motion Vectors per Macroblock | 1 |
| Hadamard | Off |
| Target Bit Rates | 384 Kbps, 768 Kbps |

Tables 8 and 9 summarize the PSNRs generated for this QCIF test sequence. Table 8 shows the results for 384 Kbps.

TABLE 8

|  | I16 × 16 | Full Search I4 × 4 | Pruned Search I4 × 4 |
|---|---|---|---|
| Luminance PSNR | 33.53 | 33.83 | 33.76 |
| Bit rate (Kbps) | 384.11 | 384.14 | 384.09 |
| Improvement due to I4 × 4 in dB | — | 0.30 | 0.23 |
| Reduction in Complexity | — | — | 69.56% |

Table 9 shows the results for 768 Kbps.

TABLE 9

|  | I16 × 16 | Full Search I4 × 4 | Pruned Search I4 × 4 |
|---|---|---|---|
| Luminance PSNR | 36.53 | 36.78 | 36.73 |
| Bit rate (Kbps) | 768.13 | 768.2 | 769.11 |
| Improvement due to I4 × 4 in dB | — | 0.25 | 0.20 |
| Reduction in Complexity | — | — | 69.62% |

As shown in Tables 4 to 9, this invention reduces the complexity of Intra 4×4 mode decision by between 65% and 70%. The reduction in PSNR versus a full-search Intra 4×4 is found to be negligible between 0.05 to 0.1 dB.

What is claimed is:

1. A method for determining direction mode for an image block in intra prediction of video frames comprising the steps of:
limiting the image blocks to 4×4 blocks;
transforming the image block into spatial frequency domain including calculating spatial frequency components of the form $X_{ij}$ for i=0 to 3 and j=0 to 3 and calculating a plurality of energy terms $E_{dc}$, $E_{vert}$, $E_{horz}$ and $E_{diag}$ as follows:

$$E_{DC} = |X_{00}|,$$

$$E_{vert} = |X_{01}| + |X_{02}| + |X_{03}|,$$

$$E_{horz} = |X_{10}| + |X_{20}| + |X_{30}|, \text{ and}$$

$$E_{diag} = |X_{11}| + |X_{12}| + |X_{13}| + |X_{21}| + |X_{22}| + |X_{23}| + |X_{31}| + |X_{32}| + |X_{33}|;$$

calculating a plurality of energy terms from the spatial frequency domain transformed image block;
determining a coarse classification from said plurality of energy terms; and
for spatial frequency domain transformed image blocks having at least one coarse classification, searching for a direction mode from among a subset of less than all possible direction modes dependent upon the coarse classification.

2. The method of claim 1, wherein:
said step of determining a coarse classification determines a coarse classification of vertical if $E_{vert} > T_m * E_{horz}$, where $T_m$ is a predetermined empirical constant; and
said step of searching for a direction mode from among a subset of less than all possible direction modes consists of searching only the directions Vertical, Vertical Right and Vertical Left for a vertical coarse classification.

3. The method of claim 2, wherein:
said step of determining a coarse classification determines a coarse classification of horizontal if $E_{horz} > T_m * E_{vert}$; and
said step of searching for a direction mode from among a subset of less than all possible direction modes consists of searching only the directions Horizontal, Horizontal Down and Horizontal Up for a horizontal coarse classification.

4. The method of claim 3, wherein:
$T_m$ is 2.

5. The method of claim 3, wherein:
said step of determining a coarse classification determines a coarse classification of diagonal if $E_{diag} > T_{diag}$, where $T_{diag}$ is a predetermined empirical constant; and
said step of searching for a direction mode from among a subset of less than all possible direction modes consists of searching only the directions Diagonal Down Left and Diagonal Down Right for a diagonal coarse classification.

6. The method of claim 5, wherein:
$T_{diag}$ is 10.

7. The method of claim 5, wherein:
said step of determining a coarse classification determines a coarse classification of DC if $\text{Max}(E_{vert}, E_{horz}, E_{diag}) < T_{dc} * E_{dc}$, where $T_{dc}$ is a predetermined empirical constant; and said step of searching for a direction mode from among a subset of less than all possible direction modes consists of searching only the direction DC for a DC coarse classification.

8. The method of claim 7, wherein:
$T_{dc}$ is 1.

9. The method of claim 7, wherein:
said step of determining a coarse classification determines a coarse classification of ambiguous if the coarse classification is neither vertical, horizontal, diagonal nor DC; and
further comprising searching for a direction mode from among all possible direction modes for an ambiguous coarse classification.

10. The method of claim 3, wherein:
said step of determining a coarse classification determines a coarse classification of vertical if $(E_{vert} > T_m * E_{horz})$ AND $(E_{vert} > T_{min})$ AND $(E_{vert} > E_{diag})$, where $T_m$ and $T_{min}$ are predetermined empirical constants; and
said step of searching for a direction mode from among a subset of less than all possible direction modes consists of searching only the directions Vertical, Vertical Right and Vertical Left for a vertical coarse classification.

11. The method of claim 10, wherein:
said step of determining a coarse classification determines a coarse classification of horizontal if $(E_{horz} > T_m * E_{vert})$ AND $(E_{horz} > T_{min})$ AND $(E_{horz} > E_{diag})$; and
said step of searching for a direction mode from among a subset of less than all possible direction modes consists of searching only the directions Horizontal, Horizontal Down and Horizontal Up for a horizontal coarse classification.

12. The method of claim 11, wherein:
$T_m$ is 2; and
$T_{min}$ is 10.

13. The method of claim 11, wherein:
said step of determining a coarse classification determines a coarse classification of diagonal if $E_{diag} > T_{diag}$, where $T_{diag}$ is a predetermined empirical constant; and
said step of searching for a direction mode from among a subset of less than all possible direction modes consists of searching only the directions Diagonal Down Left and Diagonal Down Right for a diagonal coarse classification.

14. The method of claim 13, wherein:
$T_{diag}$ is 10.

15. The method of claim 13, wherein:
said step of determining a coarse classification determines a coarse classification of DC if $Max(E_{vert}, E_{horz}, E_{diag}) < T_{ac} * E_{dc}$, where $T_{dc}$ is a predetermined empirical constant; and
said step of searching for a direction mode from among a subset of less than all possible direction modes consists of searching only the direction DC for a DC coarse classification.

16. The method of claim 15, wherein:
$T_{dc}$ is 1.

17. The method of claim 15, wherein:
said step of determining a coarse classification determines a coarse classification of ambiguous if the coarse classification is neither vertical, horizontal, diagonal nor DC; and
further comprising searching for a direction mode from among all possible direction modes for an ambiguous coarse classification.

* * * * *